United States Patent [19]

Virkar et al.

[11] Patent Number: 4,546,652
[45] Date of Patent: Oct. 15, 1985

[54] IN-SITU ON-LINE STRUCTURAL FAILURE DETECTION SYSTEM, ITS PREPARATION AND OPERATION

[75] Inventors: Anil V. Virkar, Salt Lake City; Ram Natesh, Centerville, both of Utah

[73] Assignee: Materials Research, Inc., Centerville, Utah

[21] Appl. No.: 333,480

[22] Filed: Dec. 22, 1981

[51] Int. Cl.⁴ ............................................. G01B 21/00
[52] U.S. Cl. ......................................... 73/776; 73/799
[58] Field of Search ............... 73/776, 802, 761, 775, 73/799; 340/27 R, 652

[56] References Cited

U.S. PATENT DOCUMENTS

| | | | |
|---|---|---|---|
| 2,986,928 | 6/1961 | White | 73/776 |
| 3,453,873 | 7/1969 | Lambert | 73/775 |
| 3,509,942 | 5/1970 | Lindberg | 73/781 |
| 3,596,269 | 7/1971 | Laska | 73/775 |
| 4,255,974 | 3/1981 | Dufrane et al. | 73/776 |

Primary Examiner—Anthony V. Ciarlante
Attorney, Agent, or Firm—Joseph W. Brown

[57] ABSTRACT

Structural failures, as in metal aircraft structures, are rapidly detected and measured by use of a new detection system comprising a thin film adhesively bonded to the metal structural surface to be monitored, said film containing a plurality of thin continuous strips which are adapted to be broken when a crack appears under the strips, said strips being substantially parallel but insulated from each other and the metal structural surface and arranged in a pattern such that there is frequent change in direction of the strips as in a zig-zag or rectangular pattern, each of said strips constituting a separate circuit joined to an electric power source and a sensing and recording means capable of detecting and recording any circuit failure caused by disruption of the metal strip, said disruption being caused by the formation of a crack under the said strip.

19 Claims, 3 Drawing Figures

IN-SITU ON-LINE STRUCTURAL FAILURE DETECTION SYSTEM, ITS PREPARATION AND OPERATION

BACKGROUND OF THE INVENTION

1. Field of the Invention

This invention relates to a new system for detection of structural failures. More particularly, the invention relates to a new and improved system for detection of cracks in metal structures.

Specifically, the invention provides a new and highly efficient in-situ on-line structural failure detection system for use in detecting cracks in metal structures, which system comprises a thin film adhesively bonded to the metal structural surface to be monitored, said film containing a plurality of thin continuous metal strips which are adapted to be broken when a crack appears under the strips, said strips being substantially parallel but insulated from each other and the metal structural surface and arranged in a pattern such that there is frequent change in direction of the strips as in a zig-zag or rectangular pattern, each of the said strips constituting a separate circuit joined to an electric power source and a sensing and recording means capable of detecting and recording any circuit failure as may be caused by disruption of the metal strip, said disruption being caused by the formation of a crack under the said strip.

Also provided is a method for preparing the above-noted detection systems and a method for their operation in actually detecting structural failures as evidenced by the appearance of cracks in the metal structure being monitored.

2. Prior Art

It is well known that under certain conditions critical parts in an aircraft structure are subject to failure by fatigue. Even though considerable attention and care is given in designing an aircraft structure from the point of structural integrity, the probability of failure cannot be entirely eliminated. This finite, however, small probability of failure is of great concern to industry.

During the past two decades a great deal of research work has been done to model fatigue crack growth behavior with the ultimate aim of predicting lifetime of a structural member subject to fatigue failure. Success rate in such predictions has been less than adequate or poor for a variety of reasons. One of the major difficulties in predicting lifetime of a structural member lies in the fact that in actual service the loading is irregular and not the typical periodic one used in most laboratory studies. Several research and development laboratories have attempted to incorporate spectrum loading on a laboratory scale through very elaborate systems in order to simulate the conditions experienced by an aircraft during takeoff, actual flight, and landing situations. Unfortunately, a complete load-time history for an aircraft cannot be simulated in the laboratory and the effects of an impulse overload can neither be predicted nor be realistically modelled. This is evidenced by the fact that an accurate lifetime prediction cannot be made with reasonable certainty using any existing or forseeable theory on fatigue failures. An accurate lifetime prediction of a member subject to failure by fatigue is further complicated by the fact that several aluminum and titanium alloys either strain soften or strain harden depending upon existing conditions. In a recent paper, "Fatigue Crack Growth under Spectrum Loads", ASTM STP 595, 23 (1975), Schijue discusses the present understanding of fatigue crack growth under spectrum loading and has assessed the accuracy of crack growth predictions based on existing theories. It is important to emphasize that the load-type recording program does not give a direct measure of damage introduced during operations.

Due to this unreliability of failure predictions made by laboratory modelling, it has been long recognized that periodic examination of aircraft structures for defect detection is extremely vital. Several defect or crack detection systems which can be used for this purpose when the aircraft is in operation have been proposed. However, these systems often have certain limitations. These systems consist of a variety of probes and detection systems. The surface of a structural member must be scanned with the probes to obtain a signal and this signal in turn must be processed to detect a possible crack. During routine maintenance, it is extremely cumbersome and difficult and in some cases entirely impossible to examine all the critical parts of an aircraft; for example, an inner inaccessible structural component or a bolt joining an engine to a pylon. It is in such areas that if a crack should develop and grow to a critical size and go undetected, catastrophic failure could occur. It is entirely possible that many of the recent crashes of commercial aircraft may have resulted from fatigue failures of structural members that could not be properly examined for defects during routine maintenance.

The problem is not only one of recognizing the exist of a fatigue crack but also the extent of the failure, e.g. the length of the crack. In this regard, use of a crack detection gage has received considerable attention. However, this technique requires attaching a pre-cracked gage on a structural member to a variety of loading conditions. Crack lengths in the member and the gage are experimentally determined as a function of time and are also compared with results obtained by theoretical analysis. Thus, this technique is merely an indirect method for determining crack lengths and of little value for commercial operations.

Various methods, such as disclosed in U.S. Pat. No. 4,026,660, U.S. Pat. No. 3,509,942, U.S. Pat. No. 4,106,332 and U.S. Pat. No. 3,831,171, have been proposed to solve the above-noted problems as to the detection of structural failure. However, none has been entirely satisfactory. These prior known methods, for example, do not provide an on-line process for detecting structural failures which provides an effective means for determining the initiation and propagation, or velocity and direction, of the failure, or methods for detecting failures in inaccessible areas, such as bolts, and the like.

It is an object of the invention, therefore, to provide a new system for detecting structural failures. It is a further object to provide a new and highly efficient in-situ on-line structural failure detecting system for use in detecting cracks in metal structures. It is a further object to provide a system for detecting fatigue failures as soon as they occur. It is a further object to provide a system for detecting fatigue failures which can be used during operation of the structure. It is a further object to provide a system for detecting fatigue failures which has no adverse effect on the operation of the system or the surrounding materials. It is a further object to provide a system for detecting fatigue failures which avoids the use of large circuitry. It is a further object to provide a system for detecting fatigue failures which also indicates the direction of the fatigue crack as well as the approximate length thereof. It is a further object to provide a system for detecting fatigue failures that is operative even in inaccessible areas. These and other objects of the invention will be apparent from the following detailed description thereof.

SUMMARY OF THE INVENTION

It has now been discovered that these and other objects may be accomplished by the new in-situ on-line structural failure detection system of the present invention which system comprises a thin film adhesively bonded to the metal surface to be monitored, said film containing a plurality of thin continuous metallic strips which are adapted to be broken when a crack appears under the strips, said strips being substantially parallel but insulated from each other and the structure and arranged in a pattern such that there is frequent change in direction of the strips as in a zig-zag or rectangular pattern, each of said strips constituting a separate circuit joined to an electric power source and a sensing and recording means capable of detecting and recording any circuit failure caused by disruption of the metal strip, said disruption being caused by the formation of a crack under the said strip.

It has been found that the above-described new detection system provides an unexpectedly efficient protective cover for the structure under observation and provides an instant signal of the appearance of even the slightest cracking of the structure surface. By adjusting the number of strips as well as the distance between the strips and their pattern arrangement one can also readily detect the movement of the crack as well as the approximate direction the crack is taking, thus providing valuable information relative to the corrective action to be taken.

The above-noted system is particularly effective for the detecting of cracks in inaccessible areas, such as surfaces of bolts and rivets, which have gone unobserved heretofore, as the above-noted film can be readily placed in the bolt threads and the like and send back the appropriate signal when a crack appears therein.

DETAILED DESCRIPTION OF THE INVENTION

Figure 1:
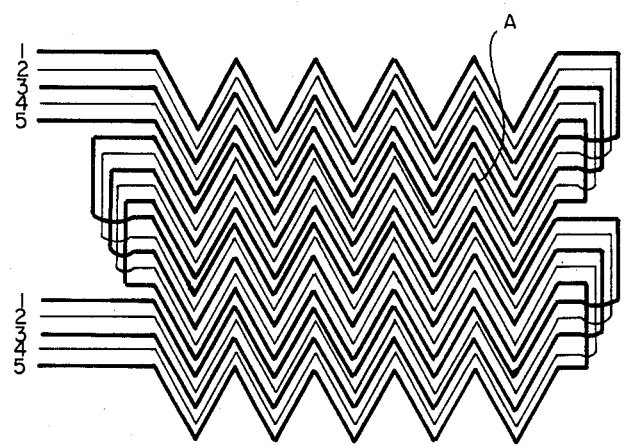
FIG. 1 of the drawing is an illustrative example of a grid design wherein the strips take a zig-zag pattern. As shown in the FIG. 1, there are five separate metal strips or circuits with about 1/16 of an inch between each strip. Line A in FIG. 1 represents a possible crack which disrupted all five of the circuits, with a time recording showing how fast the crack is forming and in approximate what direction the crack is taking.

As indicated above, the detection system of the present invention is an in-situ system, i.e. it is directly in place over the surface to be monitored, as distinguished from many prior known detection systems which observe or control the system from a distance away from the surface. Further, the new detection system of the present invention is on-line, i.e. there is a constant control or observation of the surface to be monitored, as distinguished from many prior known detection systems which effective only a partial or periodic observation of the surface to be monitored.

In order to present the inventive concept of the present invention in the greatest possible detail, the following supplementary disclosure is submitted.

The metal strips employed in the above-noted detection system are continuous strip made up of metallic powder, foil or thin strips of metal. The metals employed may be any of those known to conduct an electric current, such as iron, copper, zinc, etc., but the strips are preferably those of copper. The size of the strip may vary but should be strong enough not to disrupt before the failure of the surface to be monitored. In general, strips varying from about 20 microns to about one-half inch provide the necessary qualities for a successful strip.

The grid is formed by placing the finely dispersed metallic powder, metal strips or foil in a resinous base which can also act to adhere the strips to the desired surface to be monitored. Examples of resinous bases which can be used to form the grids include the phenolic resins, polyester resins, polyallylic resins, such as diallyl phthalate, and the carbonates and epoxide resins. Particularly preferred because of their excellent adhesion to metals and their strength to stress include the epoxy resins, particularly the polyglycidyl ethers of polyhydric phenols, such as diglycidyl resorcinol, diglycidyl ether of 2,2-bis (4-hydroxyphenyl)propane, and the like. Flexibilizing agents, such as polyamides, are preferably included with the epoxy resins to insure the desired felxibility and resistance to stress.

In preparing the grid in the above manner it is important to disperse the metallic powder so as to not loose electrical contact under strain generated by normal operating conditions.

The grids may be prepared by placing the metal strips directly on the surface to be monitored or they may be prepared separately as in the preparation of a decal and later applied to the surface by stripping off the protect cover on the adhesive. If possible it is desired to prepare the grids directly on the surface to be monitored by use of the aforementioned epoxy resins to insure proper adhesion of the grid to the metal surface.

To insure proper operation of the above-noted fatigue detection system the metal strip should be insulated from each other and from the metal surface to be monitored. The insulation from each other is accomplished in the formation of the film as noted above by using the resinous material, such as the epoxy resins, by insuring that the liquid resin is poured completely around each of the metal strips during the formation of the grid. The insulating layer between the grid and the structural member to be monitored can be generated by anodizing the component so as to form a thin (less than 1000 A°) non-conducting oxide layer. The grid may then be deposited by various techniques such as flame spraying, pouring, etc.

Figure 3:
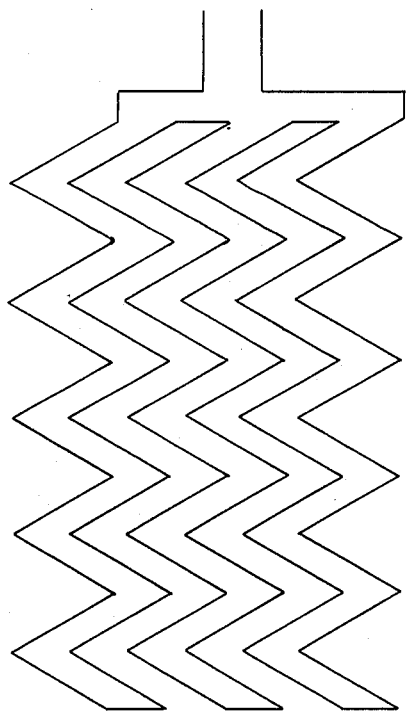
FIG. 3 of the drawing is an illustrative example of a grid design of only one strip. While this may be effective in areas where large cracks may be anticipated, it would be ineffective in accomplishing the detection of small cracks or in determining the movement of said cracks.
Figure 2:
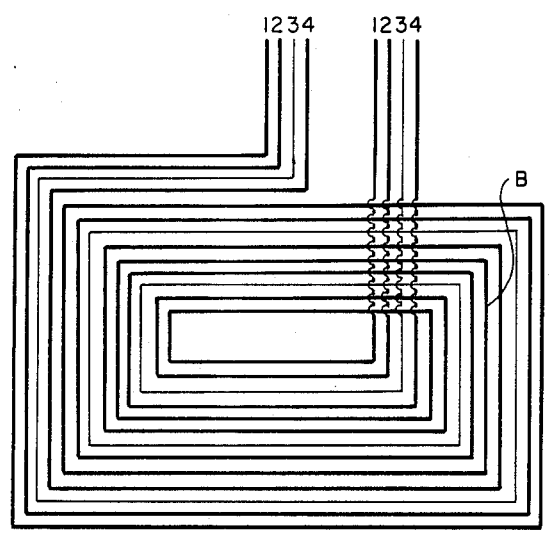
FIG. 2 of the drawing is an illustrative example of a grid design wherein the strips take a rectangular pattern. As shown in the FIG. 2, there are four different metal strips or circuits with about ⅛ of an inch between each strip. Line B in FIG. 2 represents an example of a possible crack which disrupted all four of the circuits, with a time record showing how fast the crack if forming and in approximate what direction the crack is taking.

The grid design is of importance in determining the relative ease with which a potential crack can be detected. What is required is a grid that will detect a crack in a given area with minimum complexity of electrical wires and circuitry. Crack detection gages used heretofore suffered from the fact that large circuitry was required. The present grid geometry shown in the drawing circumvents these problems and provides a simplified detection scheme. The overall dimensions of a grid will depend on its potential location of the structural component. A single grid covering a large area may extend several inches in dimension. In other cases, it may be necessary to have shorter or even longer grid dimensions. The spacing between the conductive strips is predetermined based on the level of stresses expected during service. The higher the expected stresses, the smaller will be the size of the critical crack and, therefore, smaller will be the spacing between the strips. Since the grid is a continuous conductive strip, if a crack is formed which is larger than the spacing, open circuit will result. The wavy nature of the grid ensures that a crack formed will cut the grid and not go undetected. The grid shown in FIG. 3 will be capable of detecting a crack. However, such a grid cannot yield any information with regards to further growth of the crack. The modified grid designs which would yield such information are shown in FIGS. 1 and 2 of the attached drawing. These grids are formed by superimposing several grids of the type shown in FIG. 3. The grids are superimposed in such a fashion that they are insulated from each other and are offset by a predetermined distance. This offset spacing is determined based on the severity of the expected stresses. As the crack grows, it will break the strips one by one. This information can be used to determine the approximate size of the crack. Once the crack has grown to a significant length which increases the probability of catastrophic failure, appropriate inspection and precautionary measures may be taken.

As indicated, the metal strips form separate circuits which are joined to a power source and to a sensing and recording means. The source and sensing and recording means may be any of those well known to the art. The sensing and recording means should be such that the time the open circuit occurs is recorded so that it can be correlationed with the opening of the circuits in other metal strips. Each of the said sensing and recording means for the metal strips could be connected to a single recording means so that one could quickly observe the situation on all of the metal strips at one time.

The new in-situ on-line structural failure detection system of the present invention as described above can be operated in a great variety of ways. Preferably the film bonding the metal strips to the structural member is put in place and each of the individual strips joined to a power source and to the sensing and recording means. Electric current is then placed through each of the circuits and the sensing and recording means placed under observation. As cracks appear their location and growth are recorded and when they have reached a danger point proper corrective action is taken.

The new structural failure detection system of the present invention can be used for detection of fatigue failures as evidenced by cracking of the metal surface in any metal structure, such as airplanes, bridges, cars, boats, missiles, etc. The system is particularly useful for structures such as airplanes where stress occurs in operation and under a great variety of conditions.

What is claimed is:

1. An in-situ on-line structural failure detection system for use in detecting cracks in metal structures which comprises a thin film adhesively bonded to the metal structural surface to be monitored, said film containing a plurality of thin continuous metal strips which are adapted to be broken when a crack appears under the strips, said strips being substantially parallel but insulated from each other and the metal structural surface and arranged in a pattern such that there is frequent change in direction of the strips as in a zig-zag or rectangular pattern, each of said strips constituting a separate circuit joined to an electric power source and a sensing and recording means capable of detecting and recording any circuit failure which may be caused by disruption of the metal strips.

2. A detection system as defined in claim 1 wherein the metallic strips are made up of finely divided metal powder.

3. A detection system as defined in claim 1 wherein the metallic strips are made up of finely divided iron powder.

4. A detection system as defined in claim 1 wherein the film containing the strips comprises a polymeric resin.

5. A detection system as defined in claim 1 wherein the film containing the strips comprises an epoxy resin.

6. A detection system as defined in claim 1 wherein the film containing the strips comprises a cured flexibilized polyglycidyl ether of a polyhydric phenol.

7. A detection system as defined in claim 1 wherein the metallic strips are 20 microns to ½ inch apart.

8. A detection system as defined in claim 1 wherein the number of metallic strips varies from 2 to 12.

9. A detection system defined in claim 1 wherein the metallic strips follow a zig-zag pattern wherein the direction is changed every ½ to 2 inches.

10. A detection system as in claim 1 wherein the filt is bonded to a metal surface of the group consisting of iron, steel, aluminum, titanium and alloys thereof.

11. A detection system as in claim 1 wherein a thin non-conducting layer exists between the thin film containing the metal strips and the metal surface to be monitored.

12. A detecting system as in claim 1 wherein the film is bonded to the threads of a metal bolt.

13. A detecting system as in claim 1 wherein the film is bonded to a metal surface of an airplane wing.

14. A detection system as in claim 1 wherein there are from 1 to 5 superimposed and offset strips of said continuous metal strips insulated from each other and from the metal structural surface and bonded to said structural surface.

15. A process for detecting structural failures in metal surfaces as evidenced by the appearance of a crack in the metal surface which process comprises applying to the metal surface to be monitored a thin adhesively bonded film, said film containing a plurality of thin continuous metallic strips which are adapted to be broken when a crack appears under the said strips, said strips being substantially parallel but insulated from each other and the metal structural surface and arranged in a pattern such that there is a frequent change in direction of the strips as in a zig-zag or rectangular pattern, each of said strips constituting a separate circuit joined to an electric power source and a sensing and recording means capable of detecting and recording any circuit failure such as may be caused by disruption of the metal strips, passing a current through each of the said metal strip circuits and monitoring the sensing and recording means so as to detect the formation of any cracks on the metal surface.

16. A process as in claim 15 wherein the metallic strips are made up of finely divided metal powder.

17. A process as in claim 15 wherein the film containing the strips comprise a polymeric resin.

18. A process as in claim 15 wherein the metallic strips are 20 microns to ½ inch apart.

19. A process as in claim 15 wherein the number of metallic strips varies from 2 to 20.

* * * * *